United States Patent [19]
Yoneda

[11] Patent Number: 5,173,820
[45] Date of Patent: Dec. 22, 1992

[54] MAGNETIC RECORDING AND/OR REPRODUCING APPARATUS HAVING AN ADJUSTABLE HEAD

[75] Inventor: Ko Yoneda, Tokyo, Japan

[73] Assignee: Canon Kabushiki Kaisha, Tokyo, Japan

[21] Appl. No.: 549,804

[22] Filed: Jul. 9, 1990

[30] Foreign Application Priority Data

Jul. 13, 1989 [JP] Japan ................. 1-179096

[51] Int. Cl.⁵ ............. G11B 5/52; G11B 5/56
[52] U.S. Cl. .................. 360/109; 360/84; 360/107
[58] Field of Search ........... 360/109, 105, 107, 84

[56] References Cited

U.S. PATENT DOCUMENTS

| | | | |
|---|---|---|---|
| 3,235,671 | 2/1966 | Rich | 360/109 |
| 4,081,848 | 3/1978 | Blanding | 360/109 |
| 4,233,637 | 11/1980 | Kubota | 360/109 X |
| 4,268,880 | 5/1981 | Majima | 360/109 |
| 4,329,724 | 5/1982 | Clayton | 360/109 |
| 4,356,522 | 10/1982 | Takano et al. | 360/109 X |
| 4,410,918 | 10/1983 | Watanabe | 360/75 |

FOREIGN PATENT DOCUMENTS 62-283411 12/1987 Japan ................. 360/109

Primary Examiner—John H. Wolff
Attorney, Agent, or Firm—Robin, Blecker, Daley & Driscoll

[57] ABSTRACT

A magnetic recording and/or reproducing apparatus having a magnetic head which is movable relative to a magnetic recording medium to record or reproduce information. The magnetic head is moved in a direction to approach the magnetic recording medium or in the reverse direction to that direction to periodically alter the amount of projection of the magnetic head toward the magnetic recording medium in synchronism with a cycle of relative movement of the magnetic head to the magnetic recording medium.

12 Claims, 6 Drawing Sheets 5,173,820

MAGNETIC RECORDING AND/OR REPRODUCING APPARATUS HAVING AN ADJUSTABLE HEAD

BACKGROUND OF THE INVENTION

1. Field of the Invention

This invention relates to a magnetic recording and/or reproducing apparatus in which a magnetic head is moved relative to a magnetic recording medium when magnetically recording or reproducing information.

2. Description of the Related Art

FIG. 1 is a perspective view to explain the structure of the cylinder and its associated parts of the rotary head device used in the magnetic recording and/or reproducing apparatus of this kind in the form of VTR.

In FIG. 1, reference character C denotes the cylinder of the rotary head device, around which the magnetic recording medium or magnetic tape 4 is wound by means of guide posts 23 and 24, as it runs, while sliding on the outer periphery of the cylinder C, by a tape drive system (not shown).

The cylinder C is constructed from a rotary drum (upper drum) 1 and a fixed drum (lower drum) 2. Both drums 1 and 2 are concentrically supported on a common fixed shaft 9 with a slit 3 therebetween.

The rotary drum 1 is rotated by an electric motor. As shown in FIG. 2 and FIG. 3, a magnetic head 5 is fixedly mounted in a recess 7 formed in the lower edge of the rotary drum 1, has a magnetic gap 8 and is arranged so that its tip 6 which is in sliding contact with the magnetic tape 4, i.e., the magnetic tape sliding surface (hereinafter abbreviated to the sliding surface) 6, projects radially outwardly of the outer peripheral surface of the rotary drum 1.

With such a construction and arrangement, during the recording or reproducing, the magnetic tape 4 is slidingly running under the condition that it is wound around the cylinder C, while the rotary drum 1 is rotating as shown in FIG. 1. Because it rotates together with the rotary drum 1, the magnetic head 5 is sliding on the magnetic tape 4 to effect the recording or reproducing.

By the way, at the time of the recording or reproducing operation of the VTR, rotation of the rotary drum 1 induces accompanying movement of air therewith in the vicinity of the surface of the rotary drum 1, because air has a viscosity. For this reason, a lubricating layer is formed with flow of air, intervening between the magnetic tape 4 and the rotary drum 1. Owing to this lubricating layer, a pressure is generated. By this pressure, the magnetic tape 4 is floated up from the outer peripheral surface of the rotary drum 1 to some extent.

Here, as helical scanning is performed, the width of that part of the magnetic tape 4 which confronts the rotary drum 1 varies with the angular position of the circumference of the drum. Therefore, the floating amount, or the height of floating, of the magnetic tape 4 from the rotary drum 1 is different with different angular positions of the drum. In a case where the magnetic head 5 and the recess 7 are not provided, the variation of the magnetic tape floating amount with the angular position is shown in FIG. 4. It is understood from this figure that the magnetic tape floating amount is larger on the magnetic head's advancing side of the drum, and becomes smaller on the head's receding side. Particularly at a portion in which the head recedes from the tape, the floating amount drops locally.

In an alternative case where the rotary drum 1 is provided with the magnetic head 5 and the recess 7, floating states of the magnetic tape in the neighborhood of the magnetic head are shown in FIG. 5(A) and FIG. 5(B). FIG. 5(A) shows the floating state of the tape on the head advancing side. FIG. 5(B) shows the tape's floating state on the head receding side.

Thus, in the conventional rotary head device, during the recording or reproducing, because the floating amount of the magnetic tape is large on the head advancing side, the magnetic tape gets a large spacing with respect to the magnetic head, causing the reproduced output to lower. On the head receding side, on the other hand, because the floating amount of the magnetic tape is small, the magnetic tape 4 comes into contact with the magnetic head 5, giving rise to some possibility of damaging the magnetic tape 4 and also to an unduly large wearing of the magnetic head 5. These produce problems of reducing the fidelity and durability.

Also, since the sliding resistance of the magnetic tape is unstable, the rotary drum rotates at uneven speeds. By this, the reproduced signal is disturbed, causing jitters to appear in the reproduced picture. Thus, there is another problem of deteriorating the quality of the picture. Further, since the recession of the magnetic head from the magnetic tape is accompanied with local dropping of the floating amount, this interaction with the magnetic tape induces vibrations of the magnetic tape. The spatial relationship of the magnetic head and the magnetic tape to each other in recording or reproducing the signals is disturbed at that time. Thus, yet another problem arises that turbulence occurs in the picture.

SUMMARY OF THE INVENTION

A subject of the invention is, therefore, to provide a magnetic recording and/or reproducing apparatus which can eliminate these problems.

To solve the above-described subject, according to the invention, in the magnetic recording and/or reproducing apparatus in which the magnetic head is moved relative to the magnetic recording medium to effect recording or reproducing of information, a means is used for moving the magnetic head in direction to approach the magnetic recording medium or in the reverse direction to that direction to thereby alter the amount of projection of the magnetic head toward the magnetic recording medium during the recording or reproducing operation.

According to such a feature, due to the possibility of varying the amount of projection of the magnetic head toward the magnetic recording medium, the setting of a proper spatial relationship between the magnetic head and the magnetic recording medium can be maintained throughout the entire length of each recorded or reproduced track.

Another object of the invention is to provide a magnetic recording and/or reproducing apparatus in which the magnetic head is moved relative to the magnetic recording medium to effect recording or reproducing, whereby means is used for moving the magnetic head in a direction to approach the magnetic recording medium or in the reverse direction to that direction to thereby alter the amount of projection of the magnetic head toward the magnetic recording medium, so that the spatial relationship between the magnetic recording medium and that end of the magnetic head which confronts the magnetic recording medium can be set to be proper, thus giving great advantages of improving the recording or reproducing characteristics, of preventing the magnetic recording medium from damaging, of preventing the magnetic head from wearing out, and of preventing the relative speed between the magnetic head and the medium from fluctuating, or the medium from vibrating which would otherwise result in recording or reproducing turbulent signals.

Other objects and features of the invention will become apparent from the following description by reference to the drawings.

DETAILED DESCRIPTION OF THE PREFERRED EMBODIMENTS

Figure 1:
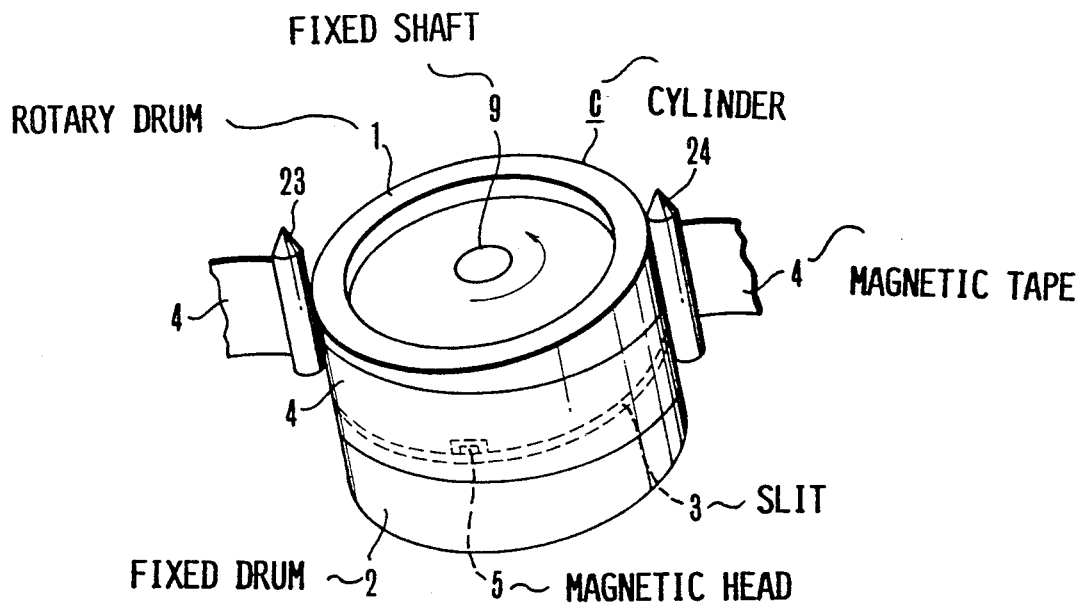
FIG. 1 is a perspective view illustrating the outer appearance of the cylinder portion of the conventional rotary head device.
Figure 2:
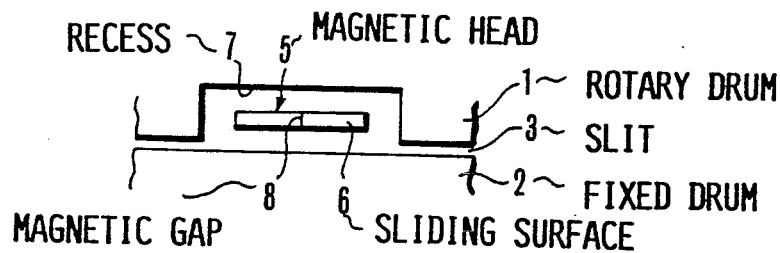
FIG. 2 is a side view in enlarged scale of the magnetic head and its peripheral parts in the same device.
Figure 3:
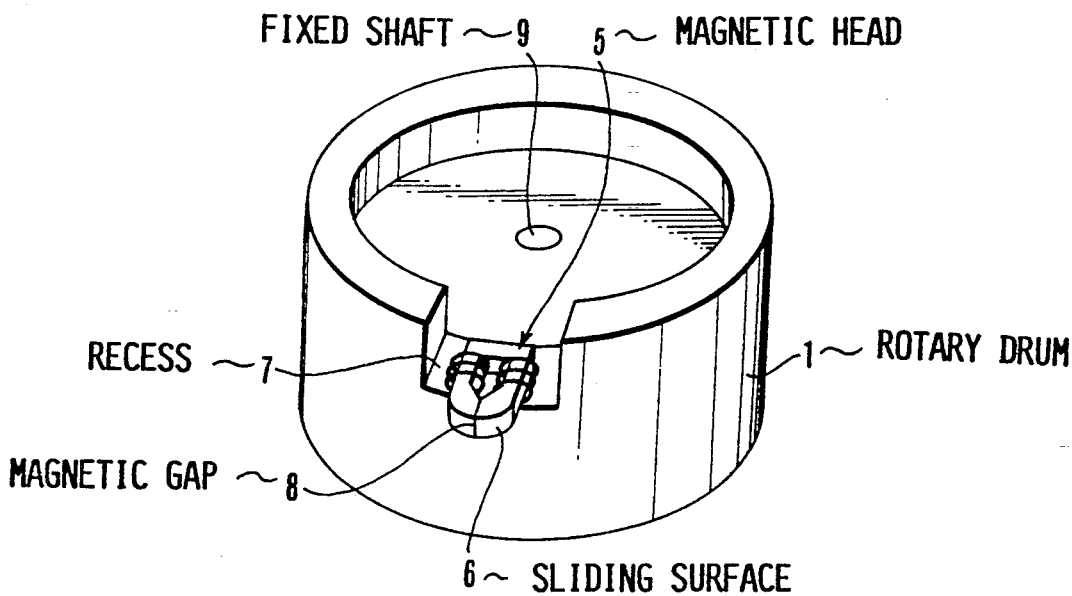
FIG. 3 is a perspective view as looked from the lower face of the rotary drum of the same device.

The present invention is next described in connection with embodiments thereof by reference to the drawings. It is to be noted that examples of rotary head devices for VTR are illustrated here. So, in every drawing of the embodiments, the common or corresponding parts with or to those of the conventional example shown in FIG. 1 to FIG. 3 are denoted by the common reference characters, and explanation of the common parts is omitted.

Figure 6:
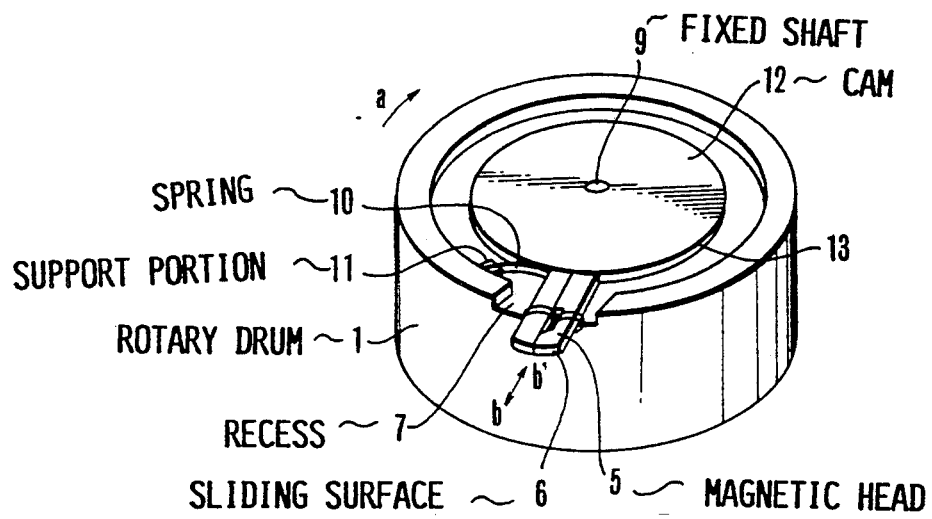
FIG. 6 is a perspective view as looked from the lower face of the rotary drum, illustrating the relevant structure to the invention of the rotary head according to a first embodiment of the invention.
Figure 7:
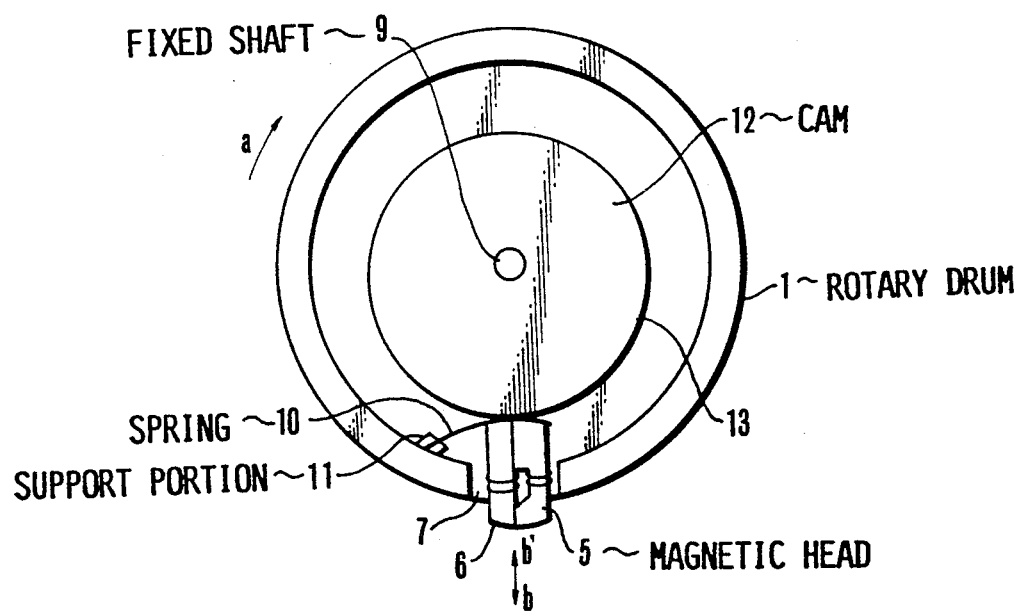
FIG. 7 is a bottom view of the same rotary drum.

First Embodiment:

FIG. 6 and FIG. 7 are taken to explain the structure of essential parts to the invention of the rotary drum of a first embodiment of the rotary head device for VTR according to the invention, illustrating the lower face of the rotary drum.

As shown in these figures, the magnetic head 5 is provided in the recess 7 formed in the lower face of the rotary drum 1. Yet, a different point from the prior art is that the magnetic head 5 is resiliently supported at one side by a spring 10 so that it can move in a direction indicated by arrow b to project outwardly of the outer side of the rotary drum toward the magnetic tape, or in the reverse direction indicated by arrow b' to that direction. That is, the rear end surface of the magnetic head 5 is fixedly mounted on the free end portion of the spring 10 whose base end portion is fixedly secured to a support portion 11 provided on the inside of the edge of the rotary drum 1. The spring 10 urges the magnetic head 5 in the direction of arrow b'.

Meanwhile, a cam 12 is fixedly mounted on the lower end (the upper end as viewed in the figures) of the fixed shaft 9. The magnetic head 5 is urged by the bias force of the spring 10 to be pressed on the outer peripheral surface 13 of the cam 12.

With such a mechanism, during the recording or reproducing, the rotary drum 1 rotates in a direction indicated by arrow a. So, the spring 10 and the magnetic head 5 rotate in unison with the rotary drum 1, moving along the periphery of the cam 12 fixed to the fixed shaft 9. In this case, as the cam 12 extrudes the magnetic head 5 from the outer periphery of the rotary drum 1, the amount of projection of its sliding surface 6 (hereinafter referred to as the "height of the magnetic head") is determined by the distance from the fixed shaft 9 to that location at which the back end of the magnetic head 5 is pressed on the outer peripheral surface 13 of the cam 12. By forming the cam 12 to an appropriate shape, variation of the height of the magnetic head can be controlled in accordance with the height of floating of the magnetic tape described before.

Figures 8A, 8B:
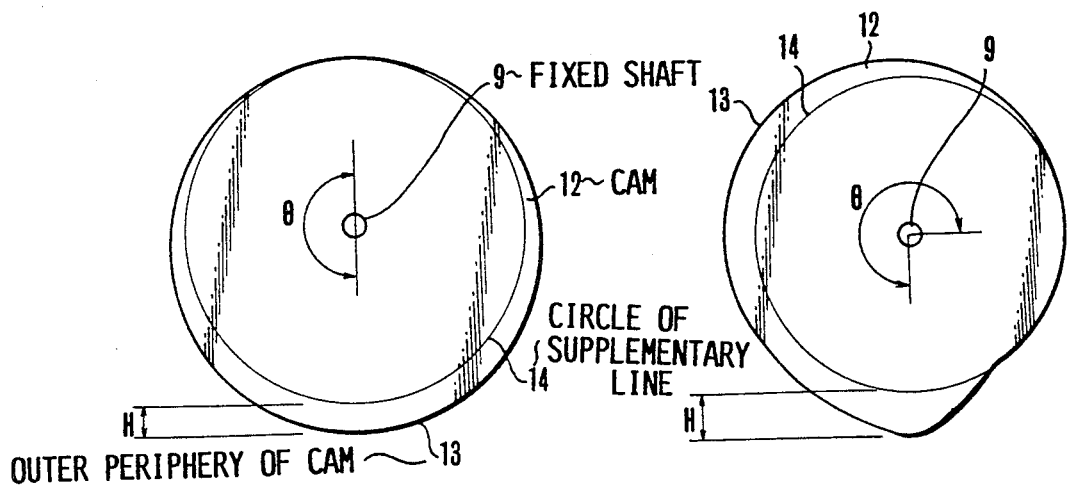
FIG. 8(A), FIG. 8(B) and FIG. 8(C) are diagrams of different examples of the cam in FIG. 6.

FIG. 8(A) is to explain the shape of the cam 12 used in the present embodiment for this purpose. The cam 12 is of true round shape, but its center is offset from the axis of the fixed shaft 9 when it is mounted to the shaft 9. To show this eccentricity, a circle 14 of supplementary line is put with its center at the axis of the fixed shaft 9. The angle 0 indicated within the circle 14 represents a range of angular positions in which the magnetic head confronts the magnetic tape.

By using such a cam 12, the magnetic head 5 reciprocates in directions indicated by arrows b and b' as the rotary drum 1 rotates. Thus, the height of the magnetic head 5 increases and decreases periodically in synchronism with rotation of the rotary drum 1. Here, the orientation of the cam 12 around the fixed shaft 9, when fixedly secured, is set so that when the magnetic head 5 advances to the magnetic tape (when the floating height of the magnetic tape is high), the height of the magnetic head 5 becomes high, while when the magnetic head 5 recedes from the magnetic tape (when the height of the magnetic tape is low), the height of the magnetic head 5 becomes low. In such a manner, the height of the magnetic head 5 is made to vary in response to variation of the height of the magnetic tape, thereby making it possible to maintain a constant relationship of the relative heights of the sliding surface 6 of the magnetic head 5 and the magnetic tape regardless of what angular position the rotary drum takes.

And, by this, the envelope of the reproduced output can be made uniform. Also, the sliding resistance of the magnetic tape is stabilized to suppress unevenness of rotation of the rotary drum. Thus, turbulence of the reproduced signal due to the uneven rotation can be prevented from occurring. Incidentally, not only the characteristic in reproducing, but also the characteristic in recording, too, can be improved, as a matter of course. Also, because the relationship of the relative heights of the sliding surface 6 of the magnetic head 5 and the magnetic tape is properly set, prevention of damage of the magnetic tape and prevention of wearing out of the magnetic head can be afforded.

It is to be noted that the magnitude H of eccentricity of the cam 12 shown in FIG. 8(A) is set to a different value depending on the system to be used. Usually, the smaller the diameter of the drum and the slower the relative speed of the drum to the magnetic tape, the smaller the value the H is set to is desirable to be. Conversely the larger the drum diameter and the faster the relative speed, the larger the value the H is set to is desirable to be. Concretely speaking by numerical values, for a VTR whose drum diameter is 40 mm with a relative speed of 3.8 m/s, it has been found that when the value of the magnitude H of eccentricity is set to 3-8 $\mu$m, the envelope becomes most uniform. Yet, considering inclusion of the application to other systems, it can be said that the magnitude H is, in general case, set to a range of 1 $\mu$m-100 $\mu$m.

Figure 8C:
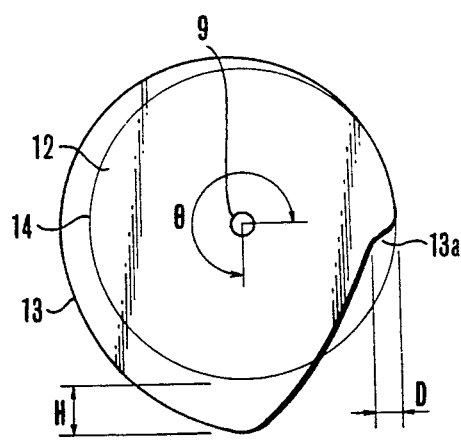

Also, the shape of the cam 12 is not limited to that of FIG. 8(A), and may be varied depending on the given system. FIGS. 8(B) and 8(C) show other examples of shapes of the cam 12. The shape of FIG. 8(B) is adapted to a case where the angle $\theta$ made by the area of the camming surface in which the magnetic head confronts the magnetic tape is larger than that of FIG. 8(A). The shape of FIG. 8(C) is used in a system of the same angle as that of FIG. 8(B), but characterized by having a novel feature that the distance from the fixed shaft 9 becomes locally small at or near the part 13a of the outer periphery 13 corresponding to a phase of rotation in which the magnetic head recedes from the magnetic tape.

Figure 4:
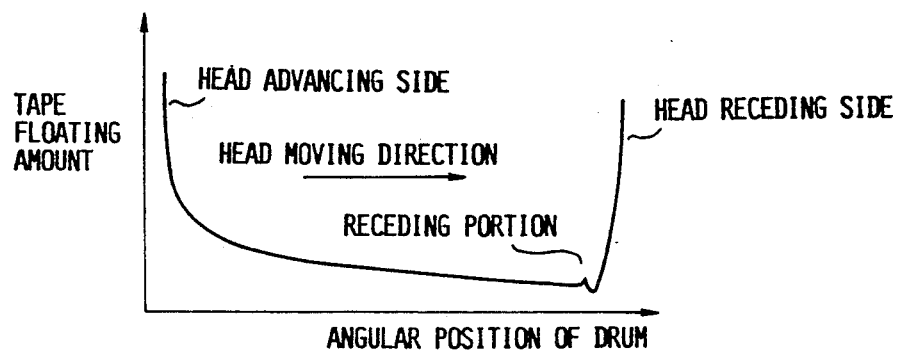
FIG. 4 is a graph illustrating the variation of the floating amount of the magnetic tape from the outer periphery of the drum during the recording or reproducing.

The use of the shape of FIG. 8(C) in the cam 12 provides a possibility that when the magnetic head recedes from the magnetic tape, the interaction between the magnetic head and the locally lowered portion of the magnetic tape floating amount shown in FIG. 4 is either eliminated or reduced to prevent the receding magnetic head from giving vibrations to the magnetic tape. In the case of the VTR, the turbulence of the picture due to the above-described vibrations can be prevented. Incidentally, it is desirable that the depth D of the recess 13a of the outer periphery 13 of the cam 12 shown in FIG. 8(C) is set to 1 $\mu$m-50 $\mu$m or more.

Figure 9:
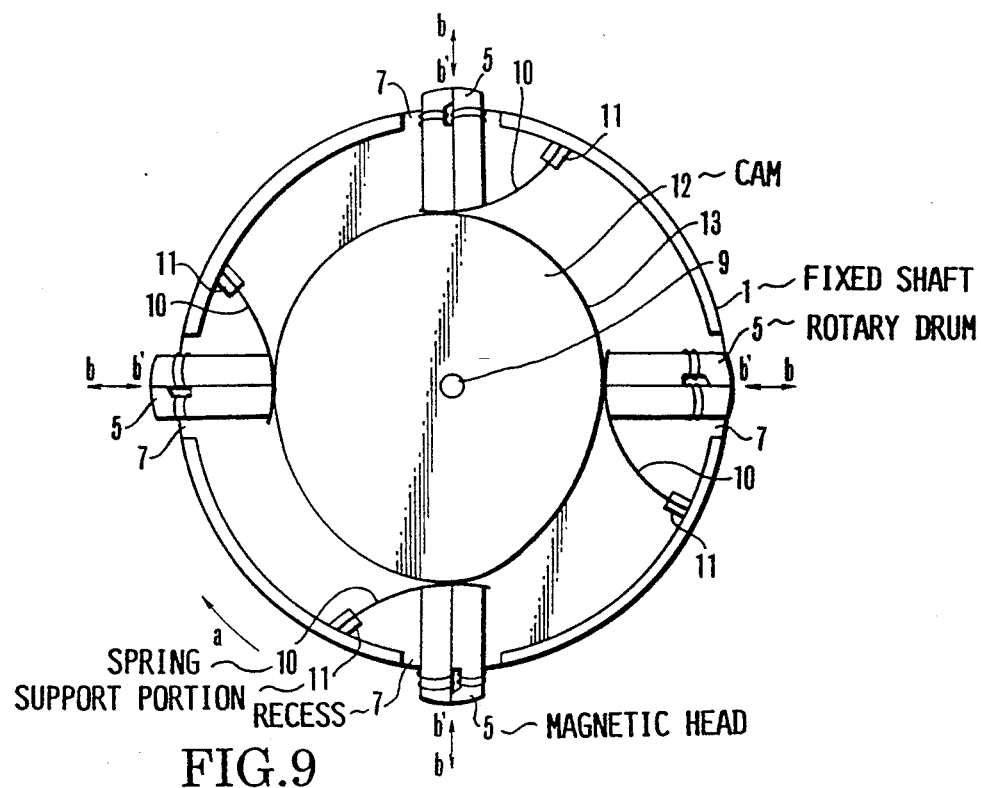
FIG. 9 is a bottom view of an example of modification of the rotary drum of the first embodiment.

By the way, even in a case where a plurality of magnetic heads are used in the rotary head, the heights of the magnetic heads can be variably controlled by the cam in a similar manner to that described above. Its example is shown in FIG. 9 as an example of modification of the first embodiment.

In this case, the four magnetic heads 5 are positioned in respective recesses 7 formed in the lower face of the rotary drum 1 and are supported at their one side by springs 10 likewise as in the first embodiment to be resiliently movable in directions indicated by arrows b and b'. The springs 10 are fixedly secured to respective support portions 11 provided near the respective recesses 7.

Meanwhile, the cam 12 is fixedly mounted on the fixed shaft 9 likewise as in the first embodiment, and each magnetic head 5 is pressed on the outer periphery 13 of the cam 12 by the respective one of the springs 10.

With such a mechanism, during the recording or reproducing, the rotary drum 1 rotates in the direction of arrow a, while each magnetic head 5 is displaced in the direction of arrow b or the direction of arrow b' depending on the distance from the fixed shaft 9 to the contact point on the outer periphery 13 of the cam 12, so that the height of each magnetic head 5 varies likewise as in the first embodiment. In such a manner, the heights of the plurality of magnetic heads can be varied under the control of one cam.

Figure 10:
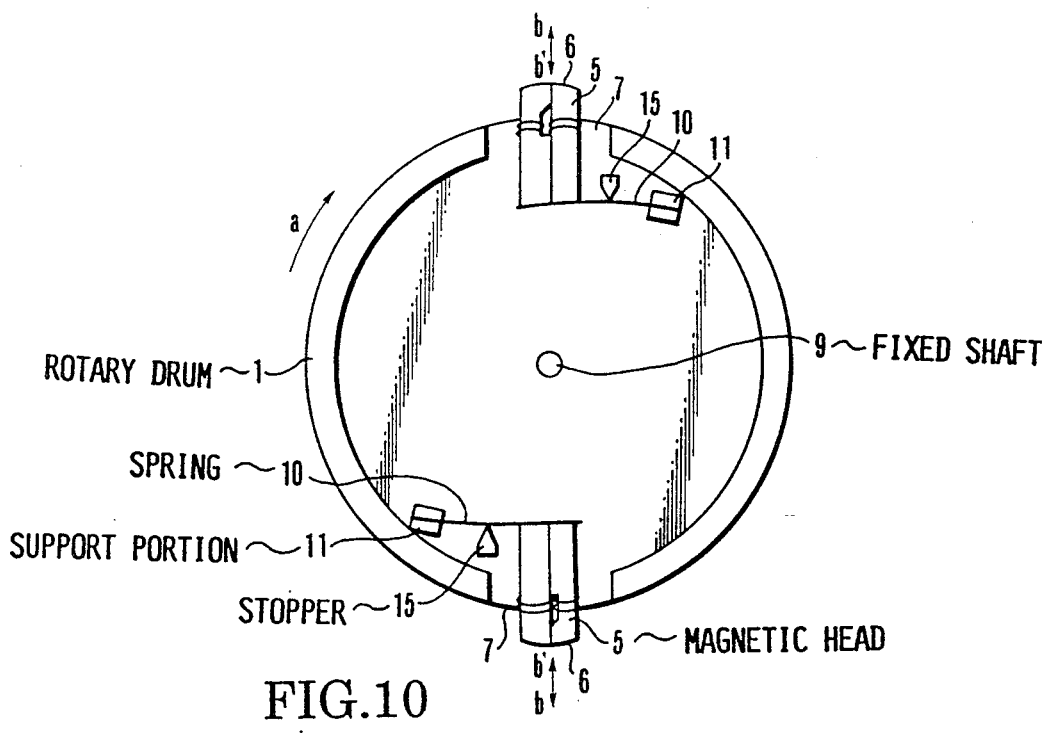
FIG. 10 and FIG. 11 are bottom views of second and third embodiments of the rotary drum according to the invention respectively.

Second Embodiment:

Next, FIG. 10 shows the rotary drum of a second embodiment of the rotary head device according to the invention.

In the present embodiment, the number of the magnetic heads 5 is two. The magnetic heads 5 are supported at their one sides on respective springs 10 fixedly mounted to respective support portions 11 provided in two points on the lower surface of the rotary drum 1, and arranged in respective recesses 7 of the rotary drum 1 to resiliently move in directions of arrows b and b'. But, a different point from the first embodiment is that no cam is provided on the fixed shaft 9. And, the spring 10 is arranged to urge the magnetic head 5 in the reverse direction to that of the first embodiment, or in the direction of arrow b to project outwardly of the outer periphery of the rotary drum 1. Also stoppers 15 are provided near the support portions 11. Because the spring 10 abuts on the stopper 15, the height of the magnetic head 5 is regulated to not more than a predetermined value.

Next, the operation of the present embodiment is described.

During the recording or reproducing, as the rotary drum 1 rotates in the direction of arrow a, the magnetic heads 5 move from the left side to the right side of FIG. 4. Before the magnetic head 5 advances to the confronting zone with the magnetic tape, the magnetic head 5 is not in contact with the magnetic tape. Therefore, the spring 10 abuts on the stopper 15 by which the height of the magnetic head 5 is regulated to the predetermined value.

When the magnetic head 5 advances to the confronting zone with the magnetic tape, the magnetic head 5 comes into contact with the magnetic tape and is pushed in the direction of arrow b' by the magnetic tape in contact with the sliding surface 6 of the magnetic head 5. Since the magnetic head 5 is supported by the spring 10, when the pressure being applied on the magnetic head 5 exceeds the bias force of the spring 10, the spring 10 deforms to the inside, displacing the magnetic head 5 to the inside of the rotary drum 1, or lowering the height of the magnetic head 5. As the magnetic head 5 further advances, the floating amount or height of the magnetic tape lowers. Therefore, the contacting force between the magnetic head 5 and the magnetic tape increases. In reaction to this, the height of the magnetic head 5 further lowers.

Thus, the height of the magnetic head is automatically controlled in such a manner that it is high where the floating amount of the magnetic tape is large, and becomes low where the floating amount is small. As a result, the relationship of the relative heights of the magnetic head and the magnetic tape is kept constant, giving similar effects and advantages to those of the first embodiment. Again, because the mechanism of the present invention is simpler than that of the first embodiment, there is an advantage that it can be put into practice at a lower price.

It should be noted that if the bias force of the spring 10 is too weak, the sufficient interface cannot be secured between the magnetic tape and the magnetic head. If too strong, an equivalent result to that when the magnetic head is fixed as in the prior art, is effected. So, the above-described advantages cannot be obtained. For the desirable bias force of the spring 10, though differing with different systems, it is recommended in general case to set forth a range of 1 g-100 g.

Figure 11:
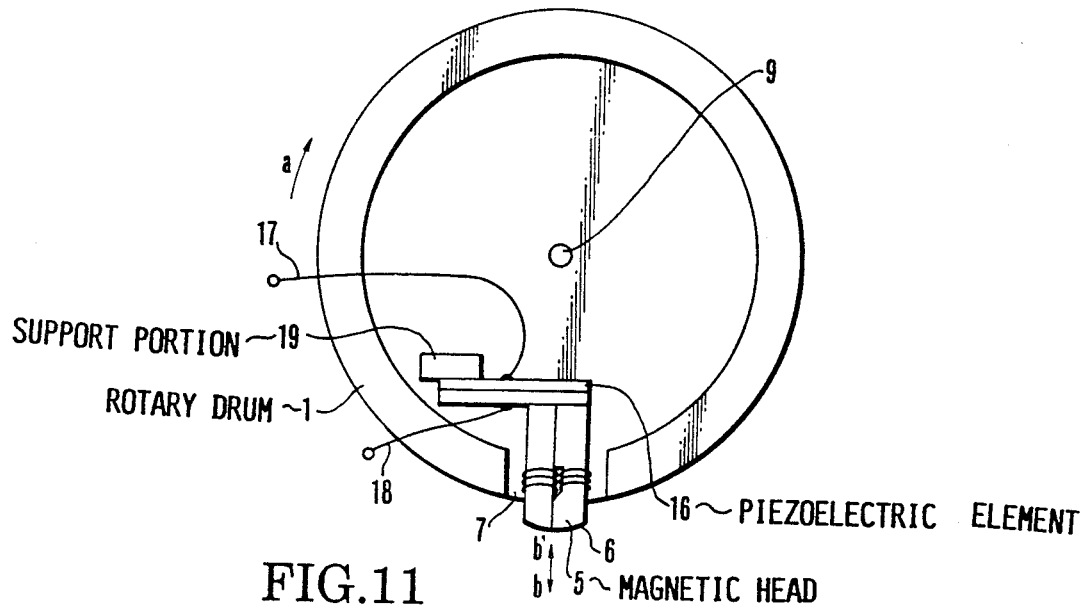

Third Embodiment:

Next, FIG. 11 is a bottom view of a rotary drum, showing a third embodiment of the invention. This embodiment is similar to the first and second embodiments in that the magnetic head 5 is arranged in the recess 7 of the rotary drum 1, but different in that the magnetic head 5 is supported at its one side by a piezoelectric element 16. That is, the magnetic head 5 is fixedly mounted on the top end portion of the piezoelectric element 16, while the bottom end portion is fixedly secured to a support portion 19 provided on the rotary drum 1.

The piezoelectric element 16 is a so-called dimorph element having its electrodes connected to lead wires 17 and 18. When a predetermined voltage is applied across these wires, a piezoelectric effect is produced so that it is deformed in one of the directions of the thickness, for example, toward the outside of the rotary drum 1. As the piezoelectric element 16 operates to deform as such, or to recover the initial shape, the magnetic head 5 is displaced in a direction of arrow b or b' respectively. Thus, the height of the magnetic head 5 varies. By properly controlling the voltage applied on the piezoelectric element 16 in accordance with the angular position of the rotary drum 1, the spatial relationship of the floating height of the magnetic tape and the height of the magnetic head 5 can be kept constant. When a system to be used in the magnetic recording and/or reproducing apparatus is determined, it is usually almost certain that a rule may be applied to find the floating state of the magnetic tape. Therefore, there is need only to shape a wave form of voltage for application to the piezoelectric element 16 so as to synchronize with rotation of the rotary drum 1.

According to such a present embodiment, similar advantages to those of the first and second embodiments can be obtained. Moreover, in the present embodiment, at the stage of trial manufacture of articles of the rotary head device, tests can be done simply by altering the wave form of voltage applied to the piezoelectric element 16 as desired. Therefore, its design is quicker and easier to do than when the design for the cam 12 of the first embodiment is carried out by manufacturing it by way of trial. It is also possible to alter the height of the magnetic head by altering the wave form of the drive signal for the piezoelectric element 16 while observing the wave form of the reproduced output. Therefore, the height of the magnetic head can be set more appropriately. This leads to an improvement in the recording or reproducing characteristics over the first embodiment and the second embodiment.

Further, another advantage of the present embodiment which should be emphasized is that the vibrations of the magnetic tape occurring when the magnetic head recedes from the confronting zone with the magnetic tape can be suppressed with a higher efficiency than in the first and second embodiments. Though having been described even in the first embodiment, because the floating height of the magnetic tape locally drops in the magnetic head receding portion as shown in FIG. 4, the magnetic head, when passing this position, works as if it snaps the magnetic tape, thus giving rise to vibrations of the magnetic tape. This phenomenon appears to be conspicuous when the magnetic head recedes from the confronting zone, because the smaller the drum diameter and the slower the relative speed of the drum to the magnetic tape, the smaller the floating amount of the magnetic tape becomes at that time.

On this account, the present embodiment is to enable the height of the magnetic head to be controlled with desired accuracy. Hence, the interaction between the magnetic head and the magnetic tape, in other words, the pushing force against each other, is kept uniform, thereby making it possible to set a condition that when the magnetic head recedes from the confronting zone with the magnetic tape, it departs from the magnetic tape smoothly, thus efficiently preventing the above-described vibrations of the magnetic tape from occurring.

Figure 12:
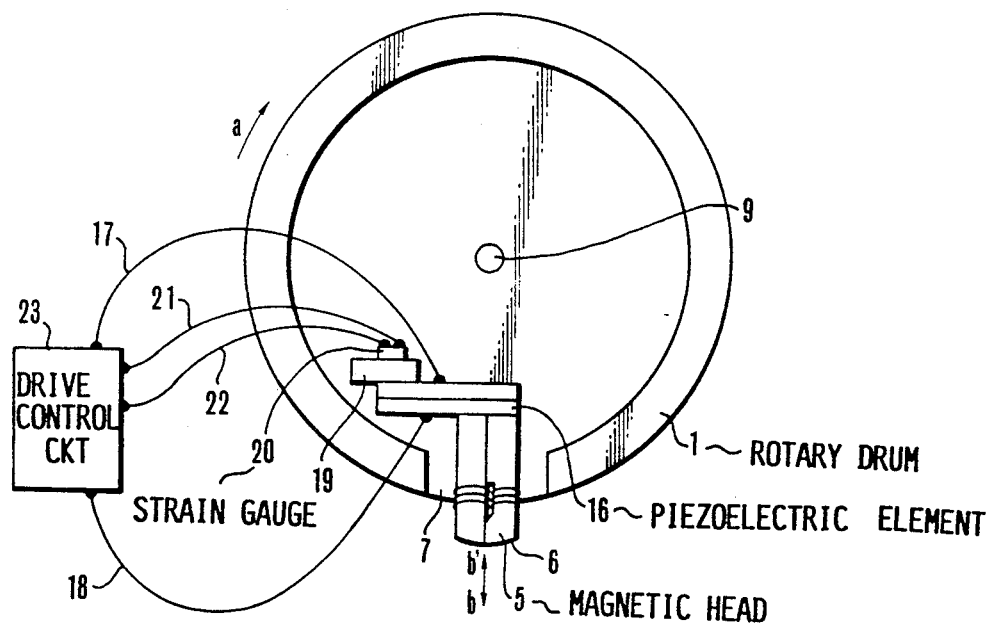
FIG. 12 is a schematic diagram of the construction of the lower face of a fourth embodiment of the rotary drum and the structure of relevant parts to the drive control of a piezoelectric element.

Fourth Embodiment:

Next, FIG. 12 shows the construction and arrangement of the constituent parts of the rotary drum of a fourth embodiment of the rotary head device according to the invention.

In the present embodiment, similarly to the third embodiment, the magnetic head is positioned within the recess 7 of the rotary drum 7, supported at its one side by the piezoelectric element 16, and arranged to be displaced in directions of arrows b and b' when the piezoelectric element 16 is driven. The present embodiment is, however, different in that a strain gauge 20 is supplemented as mounted on the back of the support portion 19 to which the piezoelectric element 16 is fixed.

Figures 5A, 5B:
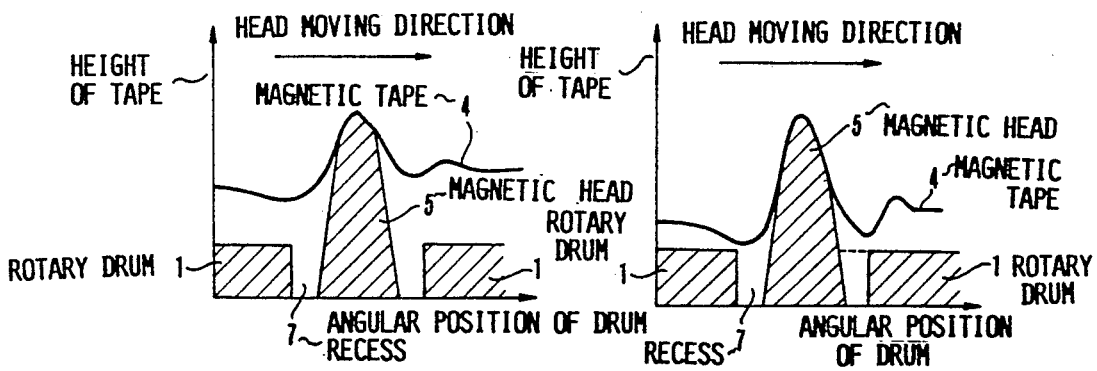
FIG. 5(A) and FIG. 5(B) are diagrams to explain the floating states of the magnetic tape on the head advancing side and the head receding side respectively.

And, the strain of the support portion 19 by the contacting force of the magnetic tape on the magnetic head 5 is detected by the strain gauge 20. Thus, the floating height of the magnetic tape is indirectly detected. In more detail, on the assumption that the height of the magnetic head is constant as shown in FIG. 5(A) or FIG. 5(B), in a region where the height of the magnetic tape is high, the deformation of the magnetic tape by the magnetic head is small and the magnetic tape's force exerting on the magnetic head, too, is small. As the height of the magnetic tape decreases, the amount of deformation of the magnetic tape by the magnetic head increases, and the force the magnetic tape applies to the magnetic head increases. The strain detected by the strain gauge 20 associated with the support portion 19 is proportional to the force applied on the magnetic head by the above-described deformation of the magnetic tape, and inversely proportional to the floating amount of the magnetic tape. Therefore, from the detected strain, the floating amount of the magnetic tape can be found indirectly.

Meanwhile, reference numeral 23 denotes a piezoelectric element control circuit which performs drive control of the piezoelectric element 16, comprising, for example, a microprocessor element and a driver element. The strain detection signal of the strain gauge 20 is applied through lead wires 21 and 22 to the control circuit 23. And, the control circuit 23 controls the driving voltage applied to the lead wires 17 and 18 of the piezoelectric element 16 in accordance with the inputted strain detection signal. The driving voltage is controlled in such a manner that when the strain of the support portion 19 is large, or when, as the height of the magnetic tape is low, the contacting force of the magnetic head with the magnetic tape is large, the height of the magnetic head becomes low, or conversely when the strain is small, as the height of the magnetic tape is high, the height of the magnetic head becomes high. A practical method of controlling the driving voltage is to set the driving voltage so that the amount of strain applied on the strain gauge 20, or the voltage of the strain signal output from the strain gauge 20 becomes constant. For this purpose, one may set a predetermined relationship of the values of the voltage of the strain detection signal with the corresponding values of the driving voltage of the piezoelectric element 16. Then, in the piezoelectric element control circuit 23, the value of the driving voltage corresponding to the given value of the voltage of the strain detection signal is found by computation and set.

In such a manner, according to the present embodiment, by utilizing the strain gauge 20, the closed loop control of the height of the magnetic head is made. Therefore, compared with the open loop control in the third embodiment, the control can be done better and more advantageously.

Though, in each of the above-described embodiments, an example of the rotary head device for the VTR has been illustrated, the technique of the invention can be applied likewise even to any other types of magnetic recording and/or reproducing apparatus wherein as recording or reproducing of information is performed by moving the magnetic head relative to the magnetic recording medium, the relative height relationship of the magnetic head and the magnetic recording medium is not constant.

As is apparent from the foregoing according to the present invention, a magnetic recording and/or reproducing apparatus in which the magnetic head is moved relative to the magnetic recording medium to effect recording or reproducing of information, is provided with means for moving the magnetic head in a direction to approach the magnetic recording medium, or in the reverse direction to that direction to alter the amount of projection of the magnetic head toward the magnetic recording medium during the recording or reproducing operation. Because of employing such a feature, the positional relationship of the magnetic recording medium and that end surface of the magnetic head which confronts the magnetic recording medium can be kept proper by altering the above-described amount of projection during the recording or reproducing operation. From this, great advantages are obtained that the recording or reproducing characteristic is improved, that the magnetic recording medium is prevented from being scratched or damaged, that the magnetic head is prevented from wearing out unduly fast, and that turbulence of the recording or reproduced signal by the changes of the relative speed between the magnetic head and the medium, or the vibrations of the medium is prevented from occurring.

What is claimed is:

1. A magnetic recording and/or reproducing apparatus in which a magnetic head is moved relative to a magnetic recording medium to effect magnetic recording or reproducing of information, comprising projection amount altering means for moving said magnetic head in a direction to approach said magnetic recording medium or in the reverse direction to that direction to periodically alter the amount of projection of said magnetic head toward said magnetic recording medium in synchronism with a cycle of relative movement of said magnetic head to said magnetic recording medium during a recording or reproducing operation.

2. A magnetic recording and/or reproducing apparatus according to claim 1, wherein said projection amount altering means periodically alters said amount of projection to predetermined values in synchronism with a cycle of relative movement of said magnetic head to said magnetic recording medium.

3. A magnetic recording and/or reproducing apparatus according to claim 1, wherein said projection amount altering means alters said amount of projection of said magnetic head so as to establish a predetermined positional relationship of said magnetic recording medium and that end portion of said magnetic head which confronts said magnetic recording medium.

4. A magnetic recording and/or reproducing apparatus according to claim 3, wherein said projection amount altering means is constructed from a cam and a resilient member.

5. A magnetic recording and/or reproducing apparatus according to claim 4, wherein the amounts of projection of a plurality of magnetic heads are altered by one set of said projection amount altering means.

6. A magnetic recording and/or reproducing apparatus according to claim 3, wherein said projection amount altering means is constructed from a resilient member.

7. A magnetic recording and/or reproducing apparatus according to claim 3, wherein said projection amount altering means is constructed from a piezoelectric element.

8. A recording and/or reproducing apparatus using a recording medium running in a first direction, comprising:
a recording and/or reproducing head moving in a second direction different from said first direction when recording or reproducing on or from said recording medium is carried out;
support means for supporting said head to be movable in the direction perpendicular to a recording surface of said recording medium; and
control means for periodically varying the amount of projection of said head in said perpendicular direction in synchronism with a cycle of a variation of the relative position between said head and said recording medium.

9. An apparatus according to claim 8, wherein said recording medium is a magnetic tape, and wherein said recording and/or reproducing head is arranged on the outer periphery of a rotary drum arranged to incline to a predetermined angle with the running direction of said magnetic tape.

10. An apparatus according to claim 9, wherein said control means includes cam means for varying the amount of projection of said head from the outer periphery of said rotary drum.

11. An apparatus according to claim 10, wherein said control means makes uniform the contacting state of said recording medium and said head occurring during one revolution of said head drum.

12. An apparatus according to claim 11, wherein said control means adjusts the height of said head relative to said head drum in accordance with a characteristic of a floating amount of said tape relative to said drum so that the relative distance of said tape to said head is kept constant.

* * * * *